(12) United States Patent
Takahashi et al.

(10) Patent No.: US 7,463,452 B2
(45) Date of Patent: Dec. 9, 2008

(54) FLYING HEAD SLIDER AND MAGNETIC DISK APPARATUS, HAVING A PAIR OF SIDE PADS WITH EACH SIDE PAD HAVING PLURAL SURFACES SPACED AT DIFFERENT DEPTHS

(75) Inventors: Kan Takahashi, Tokyo (JP); Mitsunobu Hanyu, Oume (JP); Kazuhiro Yoshida, Oume (JP); Jun Ito, Oume (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 382 days.

(21) Appl. No.: 11/085,015

(22) Filed: Mar. 21, 2005

(65) Prior Publication Data

US 2005/0213253 A1    Sep. 29, 2005

(30) Foreign Application Priority Data

Mar. 29, 2004    (JP)    ............................. 2004-097023

(51) Int. Cl.
*G11B 5/60*    (2006.01)

(52) U.S. Cl. ................................. 360/235.8; 360/236.6
(58) Field of Classification Search ............... 360/235.8, 360/236.6
See application file for complete search history.

(56) References Cited

U.S. PATENT DOCUMENTS

| | | | |
|---|---|---|---|
| 6,483,667 B1 | 11/2002 | Berg et al. | |
| 6,594,113 B2 | 7/2003 | Rao et al. | |
| 6,661,611 B1* | 12/2003 | Sannino et al. | 360/236.3 |
| 7,106,556 B2* | 9/2006 | Pendray et al. | 360/235.8 |
| 2001/0030834 A1 | 10/2001 | Kohira et al. | |
| 2002/0008939 A1* | 1/2002 | Boutaghou et al. | 360/235.8 |
| 2002/0131209 A1 | 9/2002 | Anaya-Dufresne et al. | |
| 2003/0189794 A1 | 10/2003 | Kameyama et al. | |
| 2004/0120075 A1* | 6/2004 | Rajakumar | 360/235.8 |
| 2004/0233580 A1 | 11/2004 | Yao et al. | |

FOREIGN PATENT DOCUMENTS

| | | |
|---|---|---|
| JP | 11-149734 | 6/1999 |
| JP | 2002-163815 | 6/2002 |
| JP | 2003-308671 | 10/2003 |

* cited by examiner

*Primary Examiner*—A. J. Heinz
(74) *Attorney, Agent, or Firm*—Pillsbury Winthrop Shaw Pittman LLP

(57) ABSTRACT

A pair of side pads, which are arranged to face each other by having a negative pressure generating part in the direction orthogonal to an air flow direction of a slider therebetween, are made to have three or more steps, respectively. Of the respective surfaces having the plural steps, the surfaces having a highest height respectively are not subject to a milling, and the respective surfaces of having plural steps are made to gradually have a deeper cavity depth as the surface comes closer to the air inflow end. Further, it is also effective for improving the efficiency in positive pressure generation to surround the second side pad region partially by the region of the surface being not subject to the milling, and to surround the third side pad region partially by the second surface region.

12 Claims, 22 Drawing Sheets

SIDE PAD SURROUNDING 2ND STEP SIDE PAD REGION

DEPTH OF THIRD STEP SIDE PAD REGION 62c[nm]

(126 [nm]-MILLING)

(200 [nm]-MILLING)

(1174 [nm] -MILLING)

|  | (a) | (b) | (c) | (d) | (e) |
|---|---|---|---|---|---|
| 126[nm]MILLING | MASK | MILLING | MASK | MILLING | MILLING |
| 200[nm]MILLING | MASK | MASK | MILLING | MILLING | MILLING |
| 1174[nm]MILLING | MASK | MASK | MASK | MASK | MILLING |
| DEPTH[nm] | 0 | 126 | 200 | 326 | 1500 |

FLYING HEAD SLIDER AND MAGNETIC DISK APPARATUS, HAVING A PAIR OF SIDE PADS WITH EACH SIDE PAD HAVING PLURAL SURFACES SPACED AT DIFFERENT DEPTHS

CROSS-REFERENCE TO THE INVENTION

This application is based upon and claims the benefit of priority from the prior Japanese Patent Application No. 2004-097023, filed on Mar. 29, 2004; the entire contents of which are incorporated herein by reference.

BACKGROUND OF THE INVENTION

1. Field of the Invention

The present invention relates to a flying head slider having a read-write head that reads or writes data from/into a rotating recording media such as a magnetic disk, and a magnetic disk apparatus equipped with the flying head slider.

2. Description of the Related Art

In magnetic disk apparatuses, a physical space between a flying head slider (hereinafter simply referred to as the "slider") and a disk is represented generally by two types of amounts: an element flying amount indicating the space between a read-write head and the disk surface and a minimum flying amount indicating a minimum space between the slider and the disk, and the two types of amounts are appropriately used for indicating a magnetic property and a mechanical property, respectively. Note that the slider commonly flies with respect to the disk in the state of having a pitch angle and a roll angle, thereby the element flying amount and the minimum flying amount are different in general.

In order to assure mechanical reliability (that is mainly to avoid a problem caused by a contact of a head with the disk) in the magnetic disk apparatuses, it should be ensured that the above-mentioned minimum flying amount is at a prescribed amount or more. The minimum flying amount lowers due to (1) a flying amount fluctuation caused by a manufacturing error, (2) a flying amount down caused during a head seek time, and (3) a flying amount down caused at the time of a pressure reduction (hereinafter referred to as the "pressure reducing characteristic", and when the reduction in the flying amount is small, the pressure reducing characteristic is indicated to be good), thereby these factors should be considered to the fullest extent in designing and manufacturing, so that there have been many ingenuities to suppress the flying amount reduction.

The above-described factors that reduce the flying amount are all important for ensuring the reliability of magnetic recording devices, however, recently, magnetic disk apparatuses are increasingly mounted on mobile devices and so forth. Accordingly, in consideration of such a circumstance under which the magnetic disk apparatuses are utilized in more various environments more than before, the improvement in the pressure reducing characteristic, which is an evaluation indicator of reliability, can be said to be the most important factor.

The pressure reducing characteristic, that is, the reduction in the minimum flying amount under the low pressure environment, is caused by a reduction in the flying power generation accompanied by a reduction in atmosphere density under the low pressure environment. Under the low pressure environment, the air density is reduced, so that the pressure allowing the slider to fly is reduced in the case of the same flying posture and space as of the normal pressure. Accordingly, in order to balance a load and the flying power, the flying posture and the flying space are forced to lower to the extent that the same flying power as of the normal pressure can be obtained, and the reduction in the flying space is said to be a reduction in the pressure reducing characteristic.

One of the approaches to suppress the reduction of the pressure reducing characteristic is to increase positive pressure generation at an air outflow edge of the slider, namely at a trailing pad arranged in the vicinity of a read-write element. Along with year-by-year reductions in the flying amount, the positive pressure at the trailing pad can be said to have shown an increase. However, at the same time, the size reduction of the sliders shows a progress, so that the positive pressure increase at the trailing pad is limited in view of the pad area reduction along therewith and the limitation on the load reduction for maintaining a shock resistance.

Meanwhile, by closely watching the flying posture (the pitch angle and roll angle) and the flying space of the slider at the time of the pressure reduction, it is possible to improve the pressure reducing characteristic by positively making use of their fluctuations. The reason will be described below.

First, as for the roll angle, the conventional slider equipped with the read-write element at the lateral center thereof shows no fluctuation in the element flying amount when the roll angle becomes large, while the minimum flying amount shows a reduction. Accordingly, it is required for improving the pressure reducing characteristic to prevent the increase in the roll angle.

Next, as for the pitch angle, generally, a leading pad and the trailing pad have different flying amounts from each other, and the leading pad has a larger flying amount reduction at the time of the pressure reduction, in other words, a reduction in the pitch angle is inevitable in relation thereto. However, when the pitch angle is reduced, then the minimum flying amount increases together (and the same is equally applicable to the element flying amount).

Accordingly, the provision of a positive pressure pad that generates a relatively large pressure between the leading pad and the trailing pad, and the design such that the slider rotates around the center of generating the positive pressure can prevent the minimum flying amount and the element flying amount from being reduced. For the positive pressure pad arranged between the leading pad and the trailing pad in consideration of the suppression of the roll angle, side pads arranged at right and left in the longitudinal direction of the slider can be said to be preferable (see for example Japanese Patent Laid-open Application No. 2002-163815 (Paragraph No. 0047 and so forth)).

As described above, in order to improve the pressure reducing characteristic, it is important to make use of the pitch angle reduction at the time of the pressure reduction, and it is therefore necessary to arrange the side pads generating larger positive pressure between the leading pad and the trailing pad. It should be note that, although the side pads preferably have larger areas and are arranged at the air outflow edge side, the design constraints as will be described below should be considered to the fullest extent.

First, a conventional negative pressure slider has a negative pressure cavity surrounded by the leading pad and the side pads for the purpose of effectively generating negative pressure, and the total amount of the negative pressure generated here is determined substantially by the cavity depth and the area of the negative pressure cavity. Accordingly, in order to generate larger negative pressure for the improvement of the pressure reducing characteristic as well as the shock resistance, the area of the negative pressure cavity is required to be increased, and therefore, preferably, the side pads are laterally narrow as much as possible.

Further, when the negative pressure generated in the negative cavity is increased, the pitch angle is reduced in general, so that the corresponding positive pressure is required to be generated at the leading pad. Backed by this, it is impossible to increase the side pads toward the air inflow side to a large degree so as to ensure a necessary area for the leading pad.

Furthermore, when the side pads are arranged at the air outflow edge side excessively, the space between the air outflow edge of the side pad and the disk surface becomes small, so that the side pad contacts with the disk surface in the case of an accidental fluctuation in the flying amount or the flying posture of the slider, leading to lower the reliability of the apparatus. Accordingly, the arrangement of the side pads at the air outflow edge sides is also limited. Among others, since the side pads are arranged at both the lateral ends of the slider, the side pads tend to contact with the disk surface when the roll angle is increased.

As described above, the side pads preferably generate larger positive pressure as much as possible in view of the pressure reducing characteristic, however, in view of the above-described three design constraints, it is impossible to increase the positive pressure generation by the increase of the area. Accordingly, the positive pressure generation increase per unit area (hereinafter referred to as the "positive pressure generation efficiency") is necessary.

Thus, with the introduction of the side pad exhibiting higher efficiency in generating positive pressure, the roll moment caused by manufacturing errors can also be suppressed in addition to the improvement in the pressure reducing characteristic, so that the fluctuation in the roll angle caused thereby can be suppressed to a small level. Namely, it is possible to prevent the reduction of the minimum flying amount compared to the element flying amount, leading to the improvement in the reliability of the apparatuses.

Moreover, such a side pad can realize a desired pressure even in a small area, so that it is effectively used for a slider of a smaller size such as a femto slider (width×length× height=0.7×0.85×0.23 [mm]).

SUMMARY OF THE INVENTION

In consideration of such circumstances, an object of the present invention is to provide a flying head slider capable of improving a pressure reducing characteristic of sliders by improving efficiency in positive pressure generation of a side pad, and a magnetic disk apparatus.

In order to bring a solution to the above-described problems, a flying head slider according to one embodiment of the present invention comprises a pair of positive pressure generating parts each having three or more types of surfaces that are substantially in parallel with a surface facing a disk and have different milling depths, the pair of positive pressure generating parts being arranged so as to sandwich a deep portion of a negative pressure generating part in the direction orthogonal to an airflow direction.

DESCRIPTION OF THE EMBODIMENTS

Figure 25:
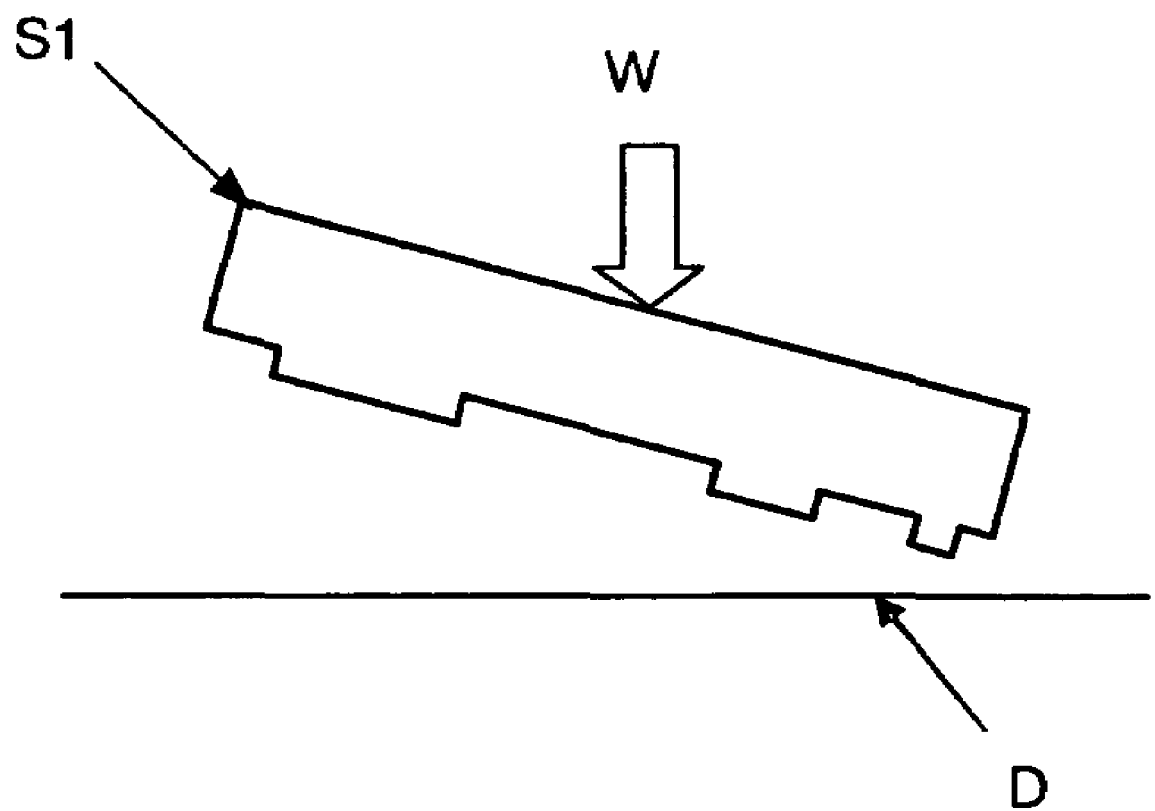
FIG. 25 is a view illustrating the flying principle of the flying head slider.

Hereinafter, the best mode to embody the present invention will be described based on the drawings. First, a flying principle of a flying head slider will be described with reference to FIG. 25. FIG. 25 is a view illustrating the flying principle of the flying head slider.

As shown in FIG. 25, a flying head slider (hereinafter simply referred to as the "slider") S1 of a magnetic disk apparatus flies constantly and stably with the help of a surface that faces a disk and has patterns of different depths formed thereon (hereinafter referred to as the "ABS"), by which a flying force generated between a disk surface D and the surface of the slider S1 facing the disk, and a load W that a suspension applies to the slider S1 is balanced. Currently, the minimum space between the disk and the slider is a very small amount being ten and several nm.

Generally, the ABS of the sliders includes four positive pressure generating parts, namely a leading pad, two side pads, and a trailing pad, and in order to generate positive pressure effectively there, a positive pressure step having a cavity depth different from those of the positive pressure generating parts is arranged at each of the air inflow edge sides of the respective pads. Further, for the purpose of improving a flying amount reduction at a pressure reduction, dependency of the flying amount on peripheral velocity and radial position, and shock resistance, the slider of this type is commonly a negative-pressure slider actively utilizing negative pressure, in which there is arranged a negative pressure generating part called a negative cavity having a cavity depth deeper than those of the aforementioned positive pressure steps.

Further, the present ABS is formed using a photolithography and the cavity depths (which is also called "milling depths") of the respective parts are 0 (zero) for the leading pad, the side pads, and the trailing pad, approximately 100 [nm] for the positive pressure step, and approximately 1500 [nm] for the negative cavity.

Figure 1:
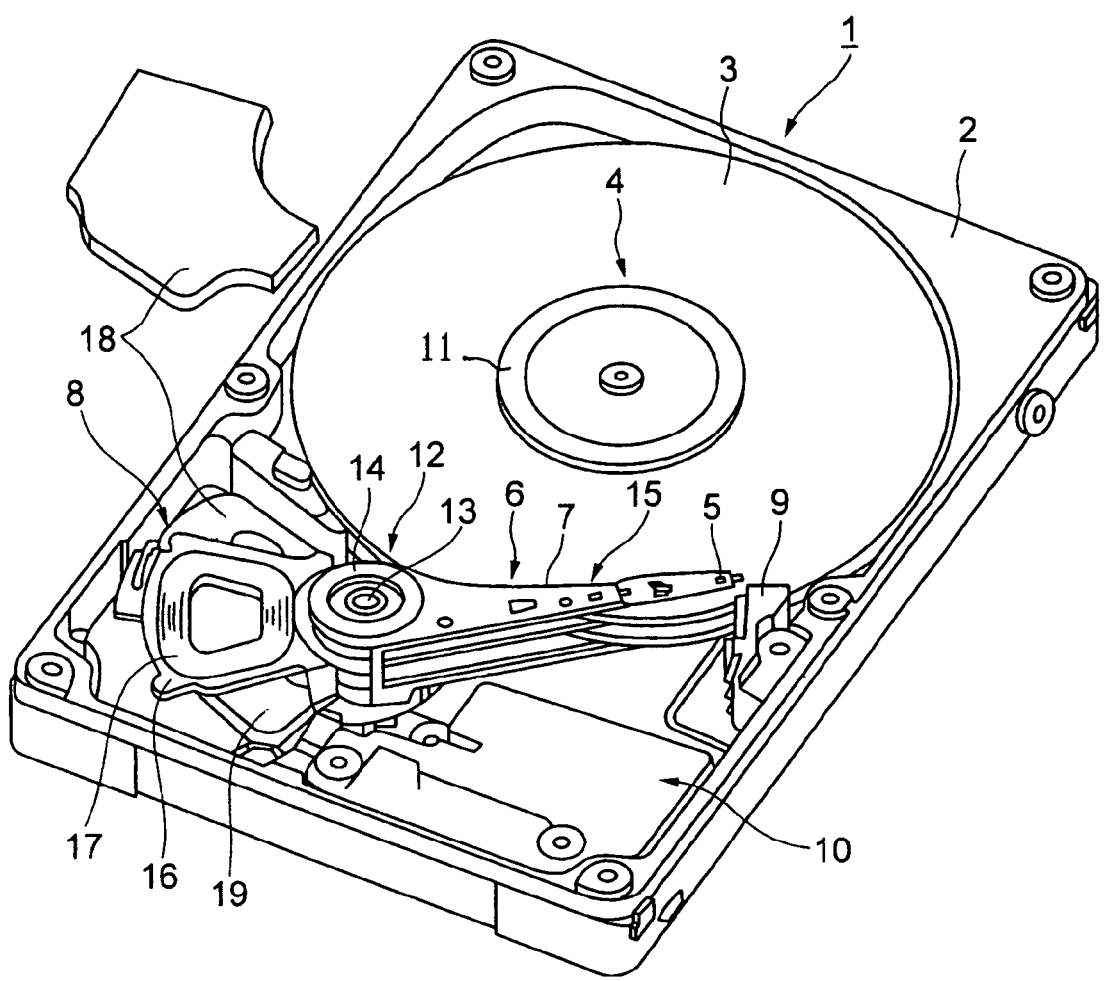
FIG. 1 is a perspective view showing a magnetic disk apparatus equipped with a flying head slider according to one embodiment of the present invention.
Figure 2:
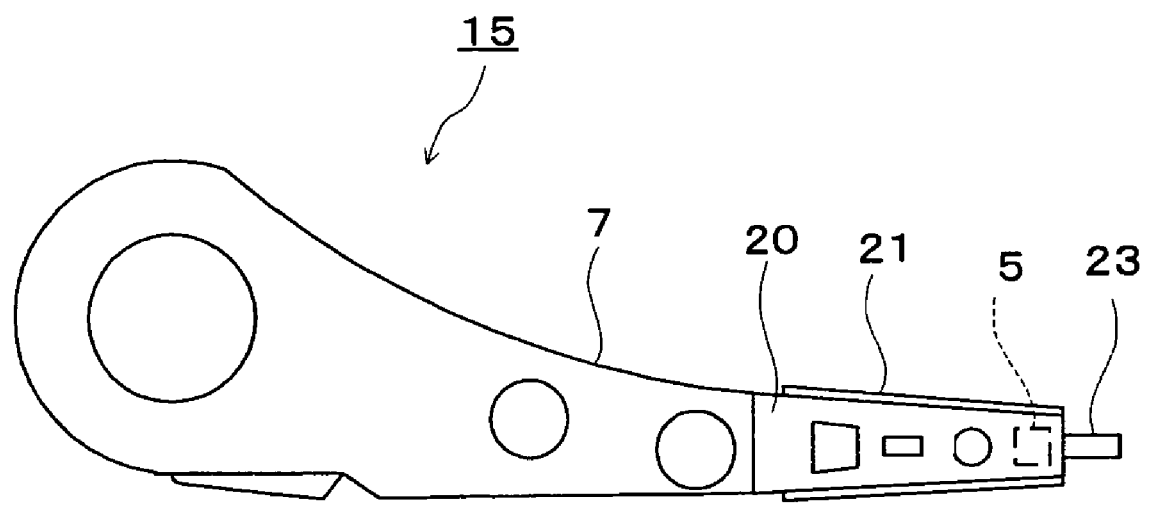
FIG. 2 is a plan view showing ahead gimbal assembly provided in the magnetic disk apparatus in FIG. 1.
Figure 3:
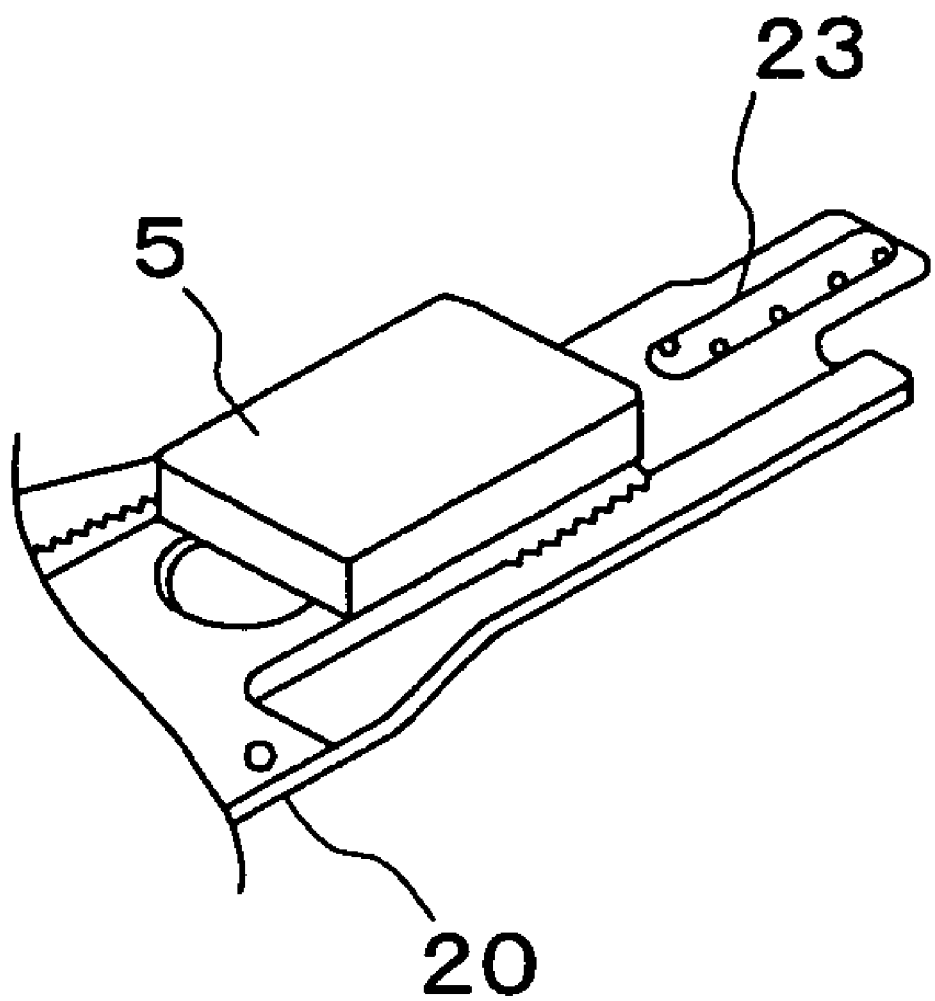
FIG. 3 is a perspective view showing a flying head slider supported on a tip portion of the head gimbal assembly.

Subsequently, a magnetic disk apparatus equipped with the flying head slider according to one embodiment of the present invention will specifically be described with reference to FIGS. 1 to 3. FIG. 1 is a perspective view showing the magnetic disk apparatus equipped with the flying head slider according to one embodiment of the present invention, FIG. 2 is a plan view showing a head gimbal assembly provided in the magnetic disk apparatus, and FIG. 3 is a perspective view showing the flying head slider supported on the tip portion of the head gimbal assembly.

As shown in FIG. 1, in a magnetic disk apparatus 1 includes a case 2 of a rectangular box shape with an opened upper surface and a top cover (not shown) which is, as an example, screwed shut to the case 2 so as to cover the case 2. In the case 2, for example, there are disposed two pieces of disks (platters) 3 being storage media of a disk shape, a spindle motor 4 as a disk drive mechanism supporting and rotating the disks 3, and a head actuator 25. Here, as the disk 3, a platter of a diameter of 65 mm (2.5 inch) having magnetic recording layers on both the side thereof is employed. These disks 3 are fitted to the outer periphery of a hub (not shown) of the spindle motor 4, and are also secured thereto with a clamp spring 11. In other words, the two pieces of disks 3 rotate in a unified manner when the spindle motor 4 is activated.

The head actuator 25 includes a carriage 6 configured by a multilayer of head arm assemblies 15, a bearing unit 12 supporting the carriage 6 in a rotatable manner, and a voice coil motor 8 actuating the carriage 6. The head gimbal assembly 15 is configured by a suspension 20 having an aftermentioned flying head slider 5 equipped with a head (magnetic pole element) that performs a write/read of signals into/out from the disks 3, and a tab 23 at the tip portion thereof, and an arm 7 supporting the suspension 20 at the tip portion thereof.

The bearing unit 12 supporting the carriage 6 includes a bearing shaft 13 vertically standing on the bottom wall of the case 2, and a hub 14 of a cylindrical shape supported by the bearing shaft 13 in a rotatable manner via a pair of bearings. The voice coil motor 8 includes a voice coil 17 secured to a supporting frame 16 of the base end portion of the head actuator 25, a pair of yokes 18 secured on the case 2 so as to sandwich the voice coil 17, and a magnet 19 secured to one of the pair of yokes 18.

Further, in the case 2, there are accommodated a ramp 9 to hold a head at a predetermined retreat position being distant from the disks 3 by sliding across the tab 23 when the flying head slider 5 is moved to the outer periphery portion of the disks 3, and a substrate unit 10 on which a head driver IC or the like is mounted. Furthermore, on the rear side of the parts accommodating portion of the case 2, a printed circuit board (not shown), on which the spindle motor 4, the voice coil motor 8, and a CPU for controlling the head, a memory, a HDD controller, and other circuits are mounted, is fitted via the substrate unit 10 by a screw clamp or the like.

Figure 4:
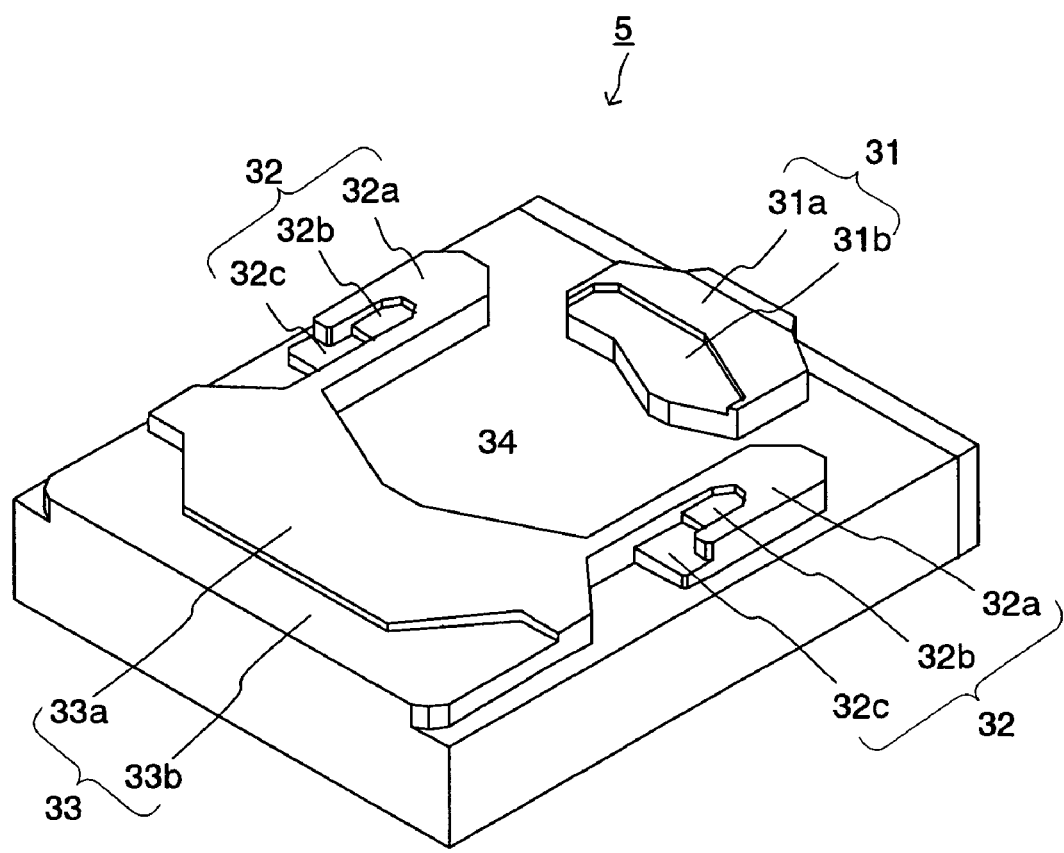
FIG. 4 is a perspective view showing the flying head slider according to one embodiment of the present invention.
Figure 5:
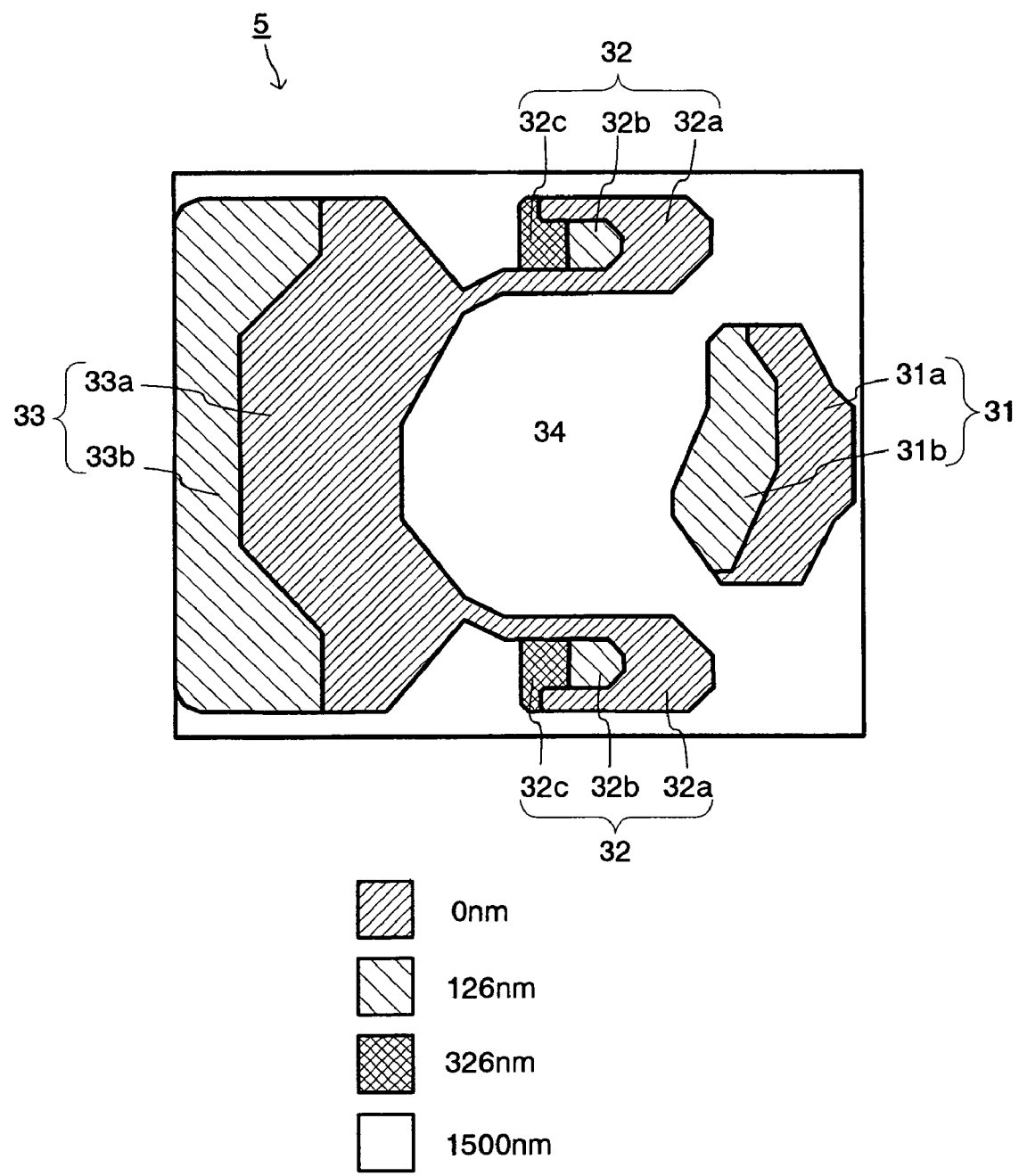
FIG. 5 is a plan view of an Air Bearing Surface of the flying head slider in FIG. 4.

Subsequently, the description will be given for the slider 5 being the principal part of the present invention. FIG. 4 is a perspective view showing the slider 5, and FIG. 5 is a plan view of the same.

As shown in these drawings, the ABS includes four positive pressure generating parts, namely a trailing pad 31, two side pads 32, 32, and a leading pad 33. Each of these positive pressure generating parts is composed of a plurality of regions having different cavity depths for the purpose of improving efficiency in positive pressure generation.

More specifically, the trailing pad 31 is composed of a trailing pad region 31a of a first step, which is formed by a surface to which no milling is performed throughout the slider manufacturing process (non-milling surface) or the like, and a trailing pad region (positive pressure step) 31b of a second step, which is arranged on the air inflow edge side of the trailing pad region 31a of the first step with its surface being situated at a position deeper than the trailing pad region 31a of the first step.

The side pad 32 is composed of a side pad region 32a of the first step formed by a non-milling surface or the like, a side pad region (first positive pressure step) 32b of the second step arranged on the air inflow edge side of the side pad region 32a of the first step with its surface being situated at a position deeper than the side pad region 32a of the first step, and a side pad region (second positive pressure step) 32c of a third step arranged on the further air inflow edge side of the side pad region 32b of the second step with its surface being situated at a position still lower deeper than the side pad region 32b of the second step.

The leading pad 33 is composed of a leading pad region 31a of the first step formed by a non-milling surface or the like, and a leading pad region 33b of the second step (positive pressure step) arranged on the air inflow edge side of the leading pad region 31a of the first step with its surface being situated at a position deeper than the leading pad region 31a of the first step.

Further, the region surrounded by the trailing pad 31, the two side pads 32, 32, and the leading pad 33 is a negative pressure generating part called a negative cavity 34 with its surface being at a position still deeper than the surfaces of the above-mentioned respective pad regions.

Subsequently, description will be given for the characteristics of the side pads 32, 32 each of which is composed of a plurality of steps as described above.

FIGS. 6A and 6B, 7A and 7B, and 8A and 8B show calculation results of the generated forces by various types of side pads, in which the side pad regions 32b, 32C, ... of the second step and thereafter are changed in view of the cavity depth and the position of step, respectively.

The side pads used in the calculation have a size of 120 [um]×400 [um] (120 [μm]×400 [μm]) with its air inflow edge being situated at 265 [μm] (265 [μm]) from a leading edge of a slider of a femto size with a negative pressure cavity having a cavity depth of 1.5 [um] (1.5 [μm]or $1.5\times10^{-6}$, the same is applicable hereinbelow) from the non-milling surface. Note that peripheral velocity and skew angle are defined to be 8.8 [m/s] and 0 (zero) [deg], being the requirements for an intermediate periphery portion of the HDD of 4200 rpm and 2.5 inch, respectively, and the flying posture is defined to be at a pitch angle of 150 [urad] (150 [μ rad]) and a flying amount of 10 [nm] being also the requirements for the intermediate periphery portion of the HDD of 4200 rpm and 2.5 inch.

When calculation is made for the case where the side pads are formed only by the non-milling surfaces, the generated force was 7.23 [mN].

Figure 6A:
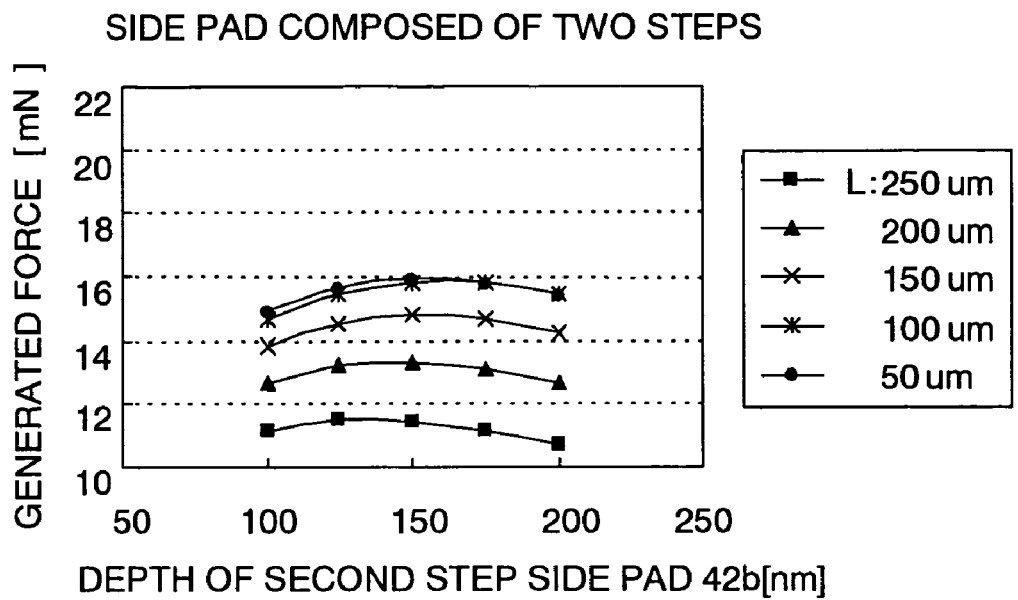
FIGS. 6A and 6B are views showing a calculation result of the force generated at side pads each composed of two steps.
Figure 6B:
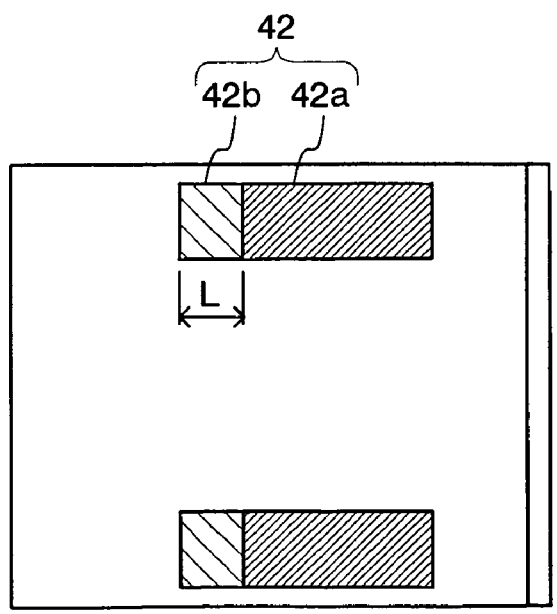

FIGS. 6A and 6B show a calculation result of the generated force by conventional side pads 42 each composed of two steps by changing the cavity depths and the positions of steps of side pad regions 42b of the second step. With respect to the position of the border lines between first side pad regions 42a of the first step being non-milling surfaces and the side pad regions 42b of the second step, the distance from the air inflow edge of the side pads 32 is changed in the range of 50 [um] though 250 [um], and the cavity depths of the side pad regions 42b from the surfaces of the side pad regions 42a of the first step being the non-milling surfaces are changed from 100 [nm] though 200 [nm]. As a result, when the side pad regions 42b of the second step have a length of 50 [um] and a cavity depth of 150 [nm], the maximum generated force was 15.9 [mN].

Figure 7A:
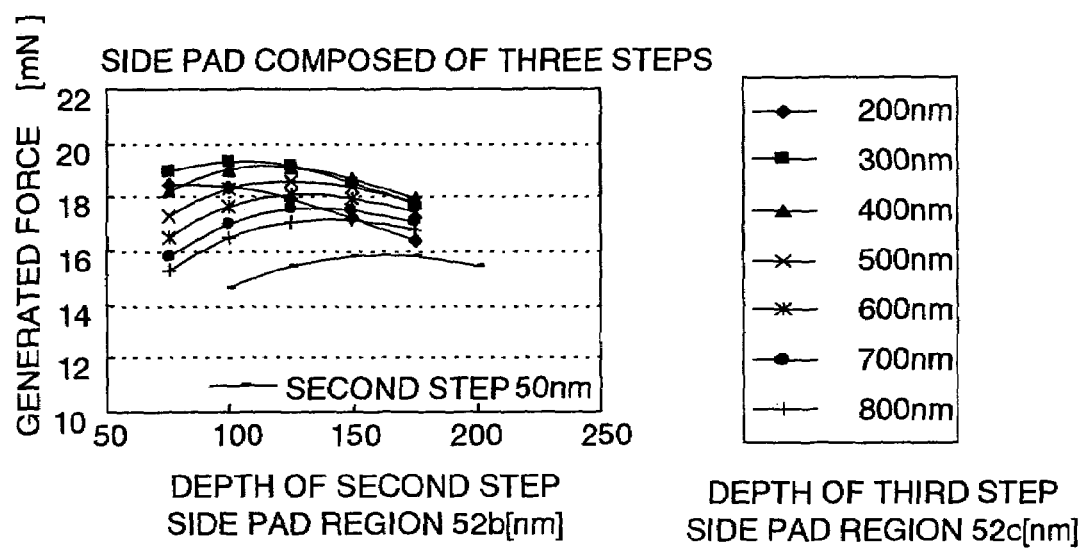
FIGS. 7A and 7B are views showing a calculation result of the force generated at side pads each composed of three steps.
Figure 7B:
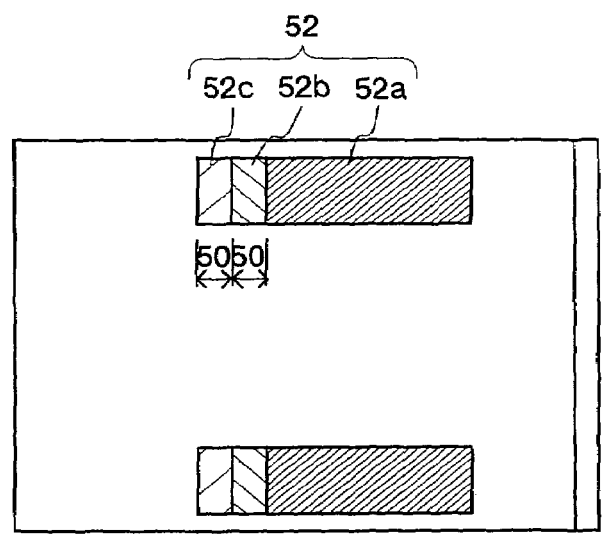

FIGS. 7A and 7B show a calculation result of the generated force by side pads 52 each composed of three steps as in FIG. 4 by changing the cavity depths of side pad regions 52b of the second step and side pad regions 52c of the third steps, respectively, from the non-milling surfaces (the surfaces of the side pad regions 52a of the first step). Note that, however, the side pad regions 52c of the third step are fixed in regions up to 50 [um] from the air inflow edges of the side pads 52, and the side pad regions 52b of the second step are defined to be in the range of 50 [um] through 100 [um] from the air inflow edges of the side pads 52.

As a result, the generated force resulted in the range from approximately 16 [mN] to 19.3 [mN], largely exceeding the generated force in the case of the side pads 42 each composed of two steps, and the maximum generated force was 19.3 [mN] that was recorded when the second side pad regions 52b have a cavity depth of 100 [nm] from the non-milling surface and the third side pad regions 52c have a cavity depth of 300 [nm] from the non-milling surface.

Figure 8A:
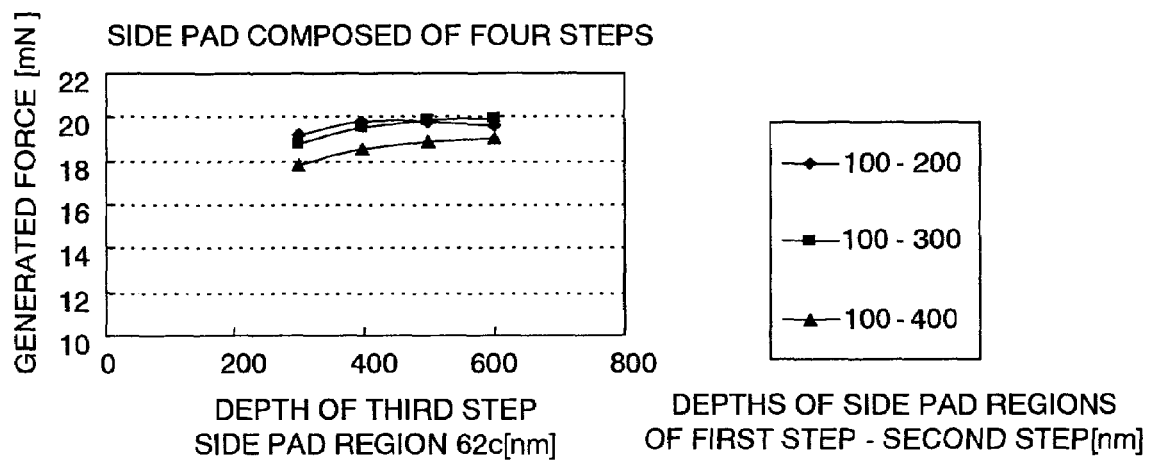
FIGS. 8A and 8B are views showing a calculation result of the force generated at side pads each composed of four steps.
Figure 8B:
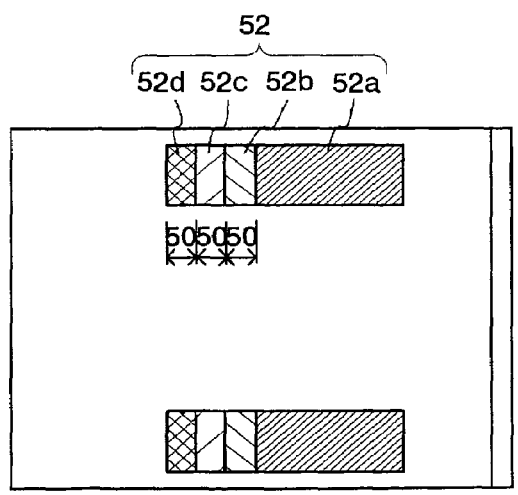

FIGS. 8A and 8B show an example where the number the steps of the side pads in FIG. 7B are increased by one step to four steps for each side pad, in which the fourth side pad regions 52d are defined to be in the range from 100 [um] to 150 [um] from the air inflow edges of the side pads 52, respectively. In this case, the maximum generated force was 19.9 [mN] when the side pad regions 52b of the second step have a cavity depth of 100 [nm] from the non-milling surface, the side pad regions 52c of the third step have a cavity depth of 300 [nm] from the non-milling surface, and the side pad regions 52d of the fourth step have a cavity depth of 600 [nm] from the non-milling surface, respectively.

Based on the above analyses, it is found that the side pad having three steps exhibits a maximum generated force extremely larger than that generated by the side pad having two steps, and further that the cavity depth designed to be gradually deeper as it becomes closer to the air-inflow edge by adding the number of steps, can generate still larger force.

Subsequently, a structure in which the side pad regions of the second and third step of the side pad are partially surrounded by the region of the non-milling surface will be described.

Figure 9A:
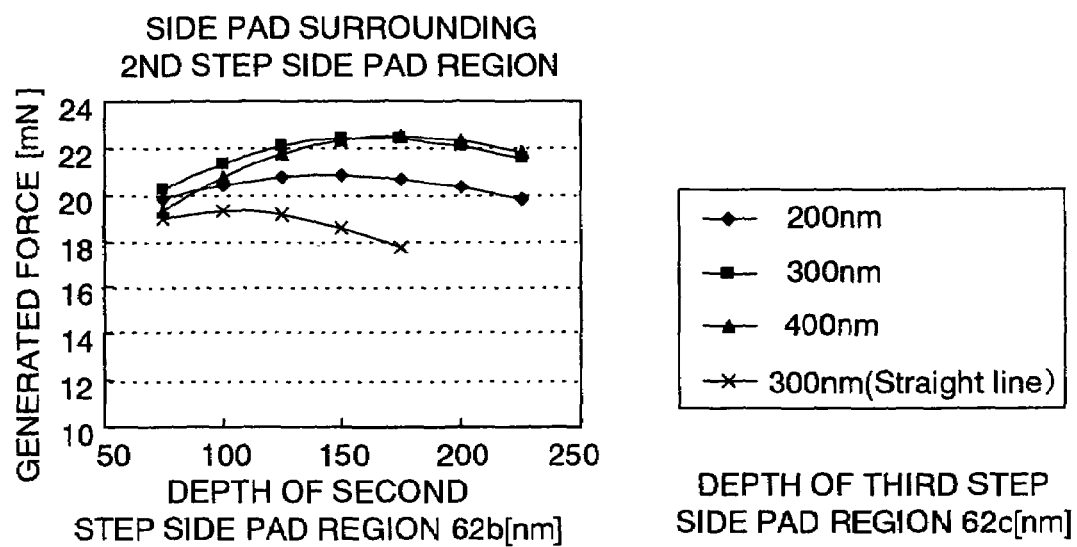
FIGS. 9A and 9B are views showing a calculation result of the force generated when a second-step side pad region is partially surrounded by a region of a surface being not subject to a milling.
Figure 9B:
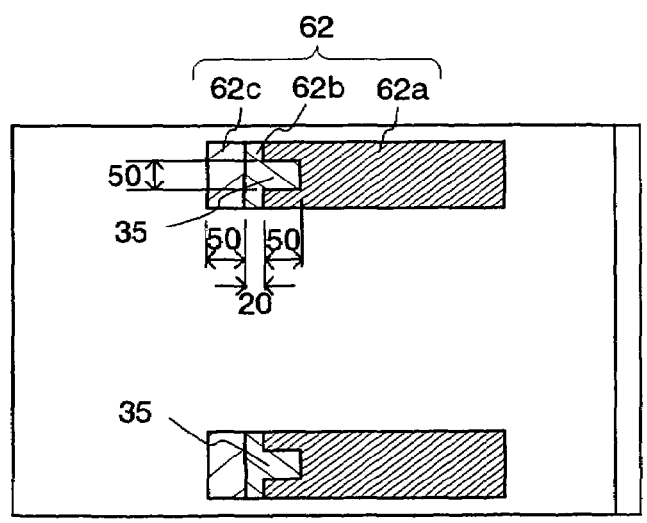

FIG. 9A shows a calculation result of the generated force in the case where a recessed portion 35 is provided at the air inflow edge of the side pad region 62 of the first step being the non-milling surface to partially surround, on the ABS, the side pad region 62b being the second step of the side pad 62 as shown in FIG. 9B.

As a result, even if the side pad region 62c of the third step and the side pad region 62b of the second step have any cavity depth from the non-milling surface, the generated force exceeds that generated by the not-surrounded side pad region (provide that in the case where the side pad region 62c of the third step is defined to have a cavity depth of 300 [nm]). Hence, it is found that the generated force increases when the side pad region 62b being the second step of the side pad 62 is partially surrounded by the region of the non-milling surface of the side pad 62.

Figure 10A:
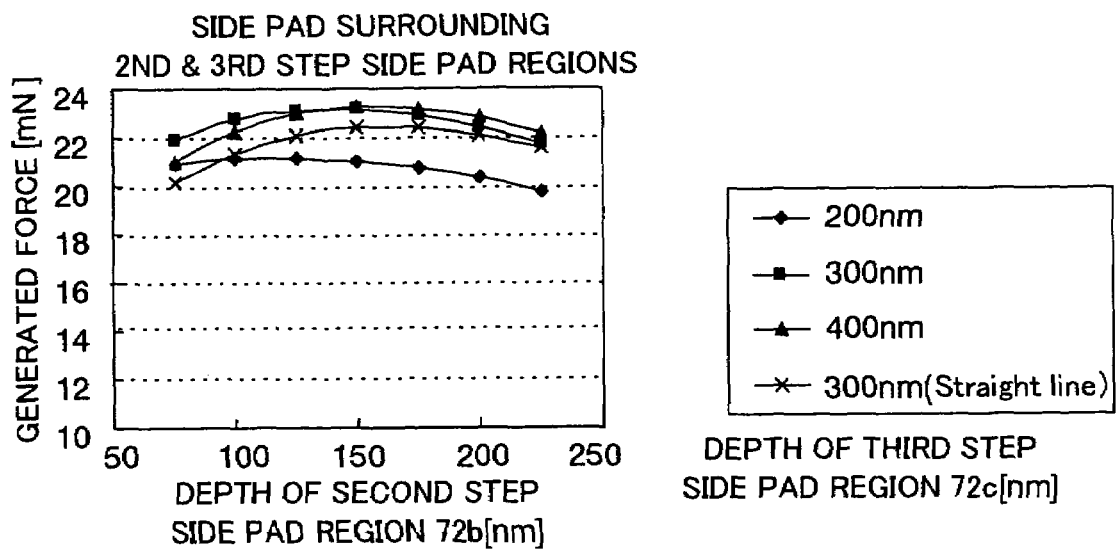
FIGS. 10A and 10B are views showing a calculation result of the force generated when the second-step side pad region is partially surrounded by the region of the surface being not subject to a milling, and also a third-step side pad region is partially surrounded by the second-step side pad region.
Figure 10B:
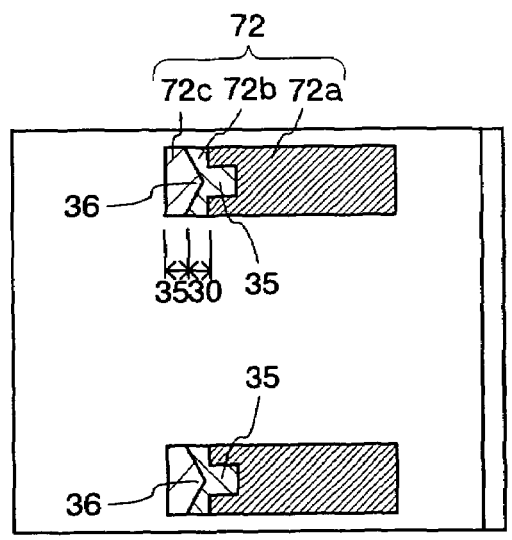

Further, FIG. 10A shows a calculation result in the case where the recessed portion 35 is provided at the air inflow edge of the side pad region 62a of the first step being the non-milling surface to partially surround the side pad region 62b being the second step of the side pad 62 on the ABS, and also a recessed portion 36 is provided at the air inflow edge of the side pad region 62b being the second step of the side pad region 62 to partially surround the side pad region 62c being the third step of the side pad 62 on the ABS as shown in FIG. 10B.

Based on this, it is found that an appropriate choice of the cavity depth from the non-milling surface of the side pad region 62b of the second step allows the generated force to increase further.

Based on the above, in order to increase the force generated by the side pad, it is found to be effective:
(1) to provide a plurality of steps;
(2) to partially surround the side pad region of the second step by the region of the non-milling surface and also partially surround the side pad region of the third step by the side pad region of the second step.

In the above, the description has been given to the multistep structure of the side pad, whereas such a multistep structure is also applicable to the other parts of the ABS in addition to the side pad. Such an application example will be described below.

Figure 11:
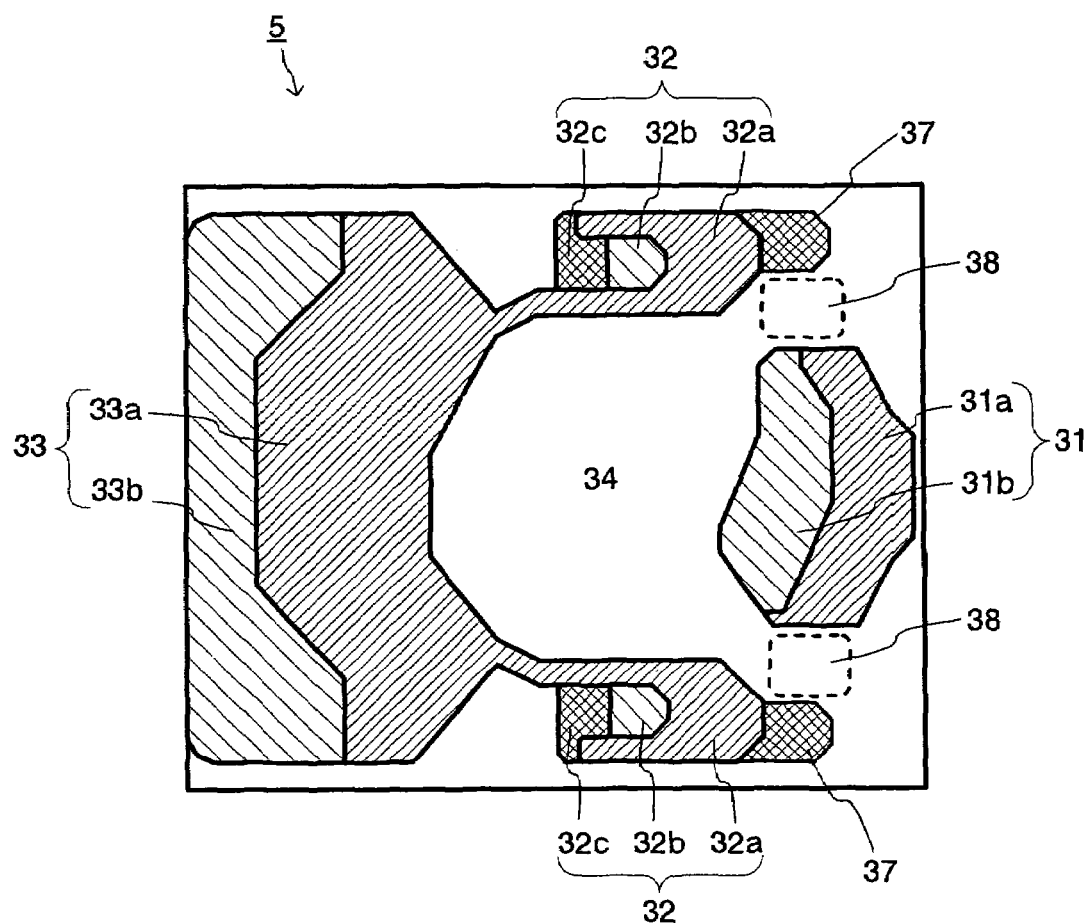
FIG. 11 is a plan view showing an example in which skirts are provided at air outflow edges of the side pads as extensions as an application of a cavity composed of plural steps.

FIG. 11 shows one in which a step portion 37 having the same height as of the side pad region 32c being the third step of the side pad 32 is provided as an extension at the air outflow edge of the side pad 32. Hereinafter, the step portion 37 is referred to as a "skirt". By such a provision of the skirt 37 at the outflow edge of the side pad 32 as an extension, a region 38 between the skirt 37 and the trailing pad 31 is added as a region of the negative cavity 34 to thereby increase the area of the negative cavity 34. Backed by this, the negative pressure applied to the slider 5 increases, so that the improvement in the pressure reducing characteristic and the shock resistance can be expected.

Further, the cavity depth of the region of the skirt 37 from the non-milling surface is defined to be the same value as that of the side pad region 32c being the third step of the side pad 32. Briefly, when the side pad region 32c being the third step is obtained through plural milling processes, it is possible to obtain the region of the skirt 37 at a time.

The skirt 37 is arranged in the vicinity of the outflow edge of the slider 5, raising a concern about the contact of the outflow edge of the skirt 37 with the disk surface. Notwithstanding the above, in the case of this slider 5 of the present embodiment, there are provided options of the cavity depths of the side pad 32*b* of the second step and the cavity depths of the side pad 32*c* of the third step, allowing the provision of the skirt 37 capable of ensuring a larger space with respect to the disk surface without additionally requiring a milling process for obtaining the cavity depth of the skirt 37 by way of setting the cavity depth of the skirt 37 to be the same as of the side pad region 32*c* of the third step having a still deeper depth from the non-milling surface, so that the reduction of the flying height of the slider 5 forced by the presence of the skirt 37 is avoidable.

Figure 12:
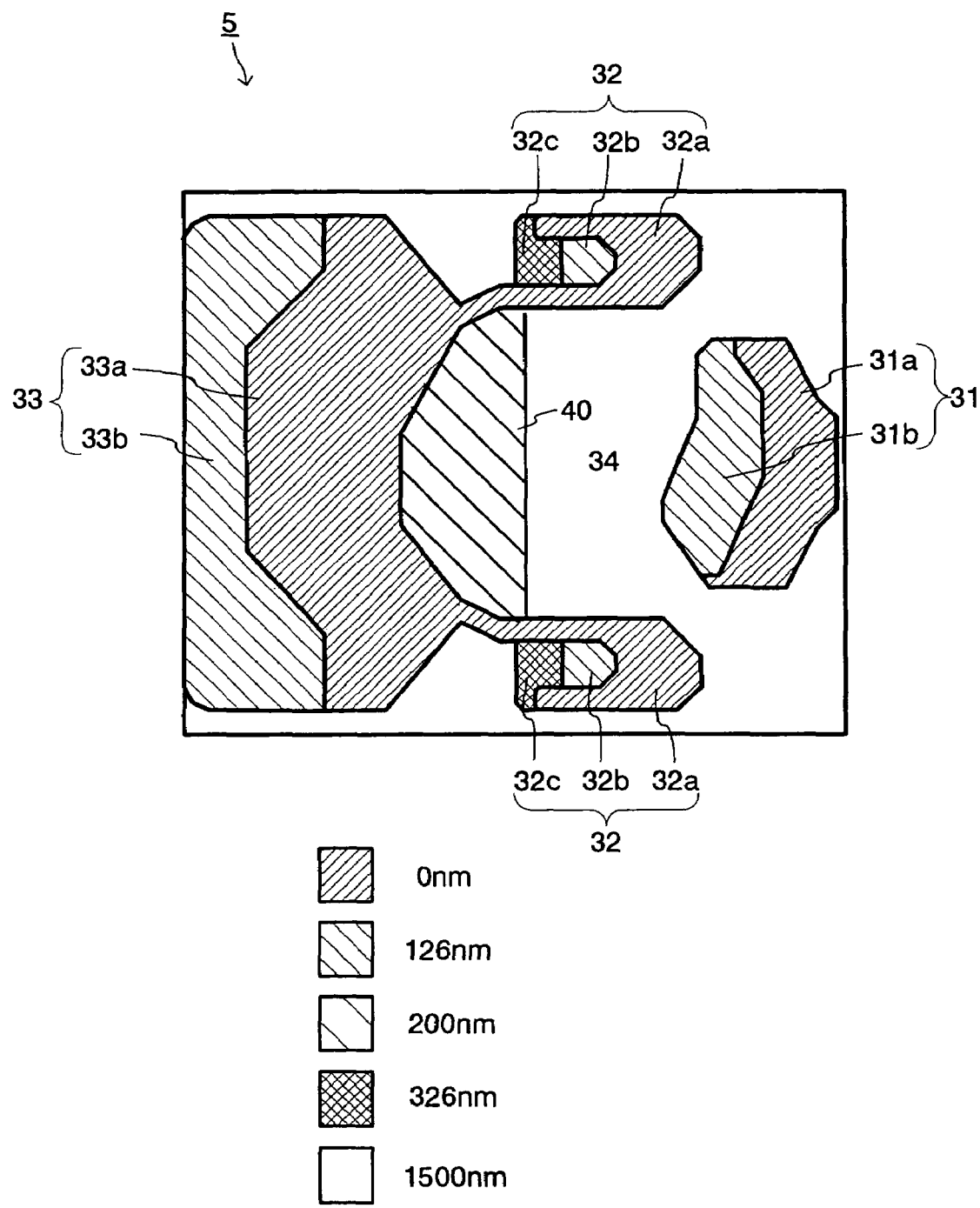
FIG. 12 is a view showing an example in which a negative pressure dead zone is provided at a negative cavity 34 as an application of a cavity composed of plural steps.

FIG. 12 is the other one in which the multistep structure is applied to the negative cavity 34 being the negative pressure generating part. Generally, it is known that, by obtaining a desired flying force of an air film based on a larger difference between positive pressure and negative pressure, it is possible to suppress the dependence of the flying amount on the air pressure, peripheral velocity, and radial position. On the basis of this, an attempt of generating larger negative pressure in the vicinity of the position of the side pad that generates positive pressure leads to support the side pad by large positive and negative pressures, so that the flying amount of the side pad can be suppressed and thereby an improvement of the pressure reducing characteristic can be expected.

As one concrete approach thereof, as shown in FIG. 12, it is conceivable to provide a shallow cavity region (hereinafter referred to as the "negative pressure dead zone") 40 on the leading side of the negative cavity 34', where the generation of negative pressure is limited. In this example, the cavity depth of the negative cavity 34 from the non-milling surface is defined to be 1500 [nm], and the cavity depth of the negative pressure dead zone 40 from the non-milling surface is defined to be 200 [nm].

As showing in the drawing, with the provision of the negative pressure dead zone 40 on the air inflow edge side of the negative cavity 34, the center of the negative pressure generation can further be moved to the trailing side, namely toward the vicinity of the side pads 32.

Figure 13:
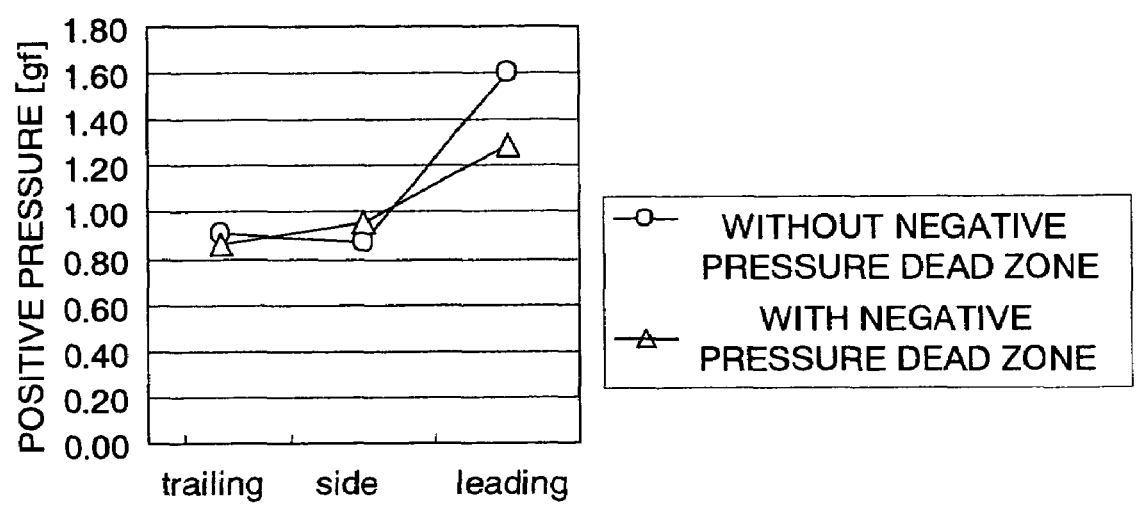
FIG. 13 is a view showing an effect of the negative pressure dead zone in FIG. 12 on the generated amount of positive pressure.
Figure 14:
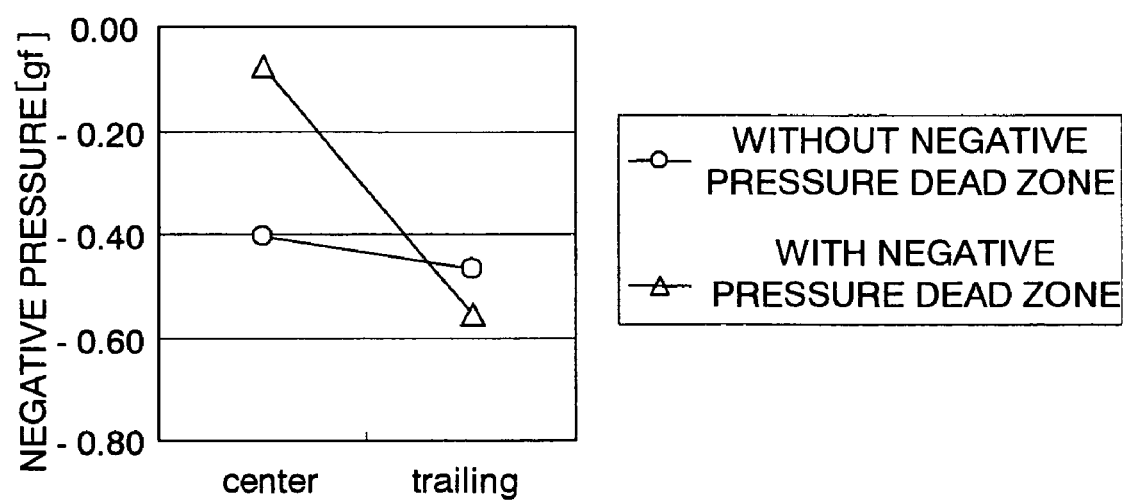
FIG. 14 is a view showing an effect of the negative pressure dead zone in FIG. 12 on the generated amount of negative pressure.
Figure 15:
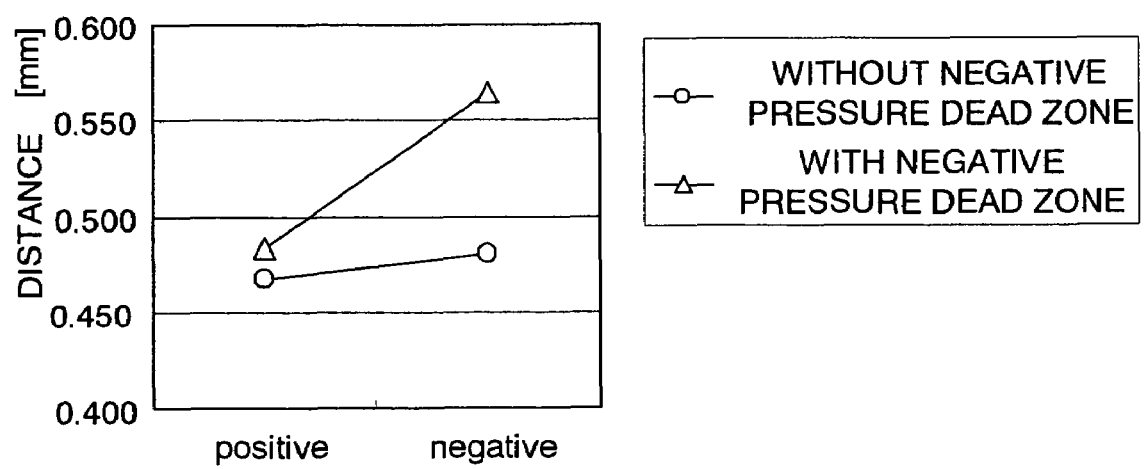
FIG. 15 is a view showing an effect of the negative pressure dead zone in FIG. 12 on the respective center positions of generating positive and negative pressures.

As for both the sliders with and without the negative pressure dead zone 40, FIG. 13 shows a calculation result of generated amounts of positive pressure at the leading pad 33, the side pads 32, and the trailing pad 31 respectively; FIG. 14 shows a calculation result of the generated amounts of negative pressure at the leading side portion and the trailing side portion both of the negative cavity 34; and FIG. 15 shows the distances from the leading edge of the centers that generate positive and negative pressures, respectively. It is assumed here that the negative pressure dead zone 40 is arranged on the leading side portion of the negative cavity 34.

Based on the results, it is found that, in the slider without the negative pressure dead zone 40, which therefore exhibits poor pressure reducing characteristic, the generated force at the trailing pad 31 is larger than that generated at the side pad 32, while in the slider with the negative pressure dead zone 40, which therefore exhibits favorable pressure reducing characteristic, contrary to the former, the generated force at the side pad 32 is larger than that generated at the trailing pad 31. Further, in the comparison of the positions that generate negative pressure, in the slider with the negative pressure dead zone 40 compared to that without the negative pressure dead zone 40, the center of the negative pressure generation moves toward the trailing side, namely closer to the position of the side pad 32 that generates positive pressure (for example, in the vicinity of 0.790 [mm]).

Figure 16:
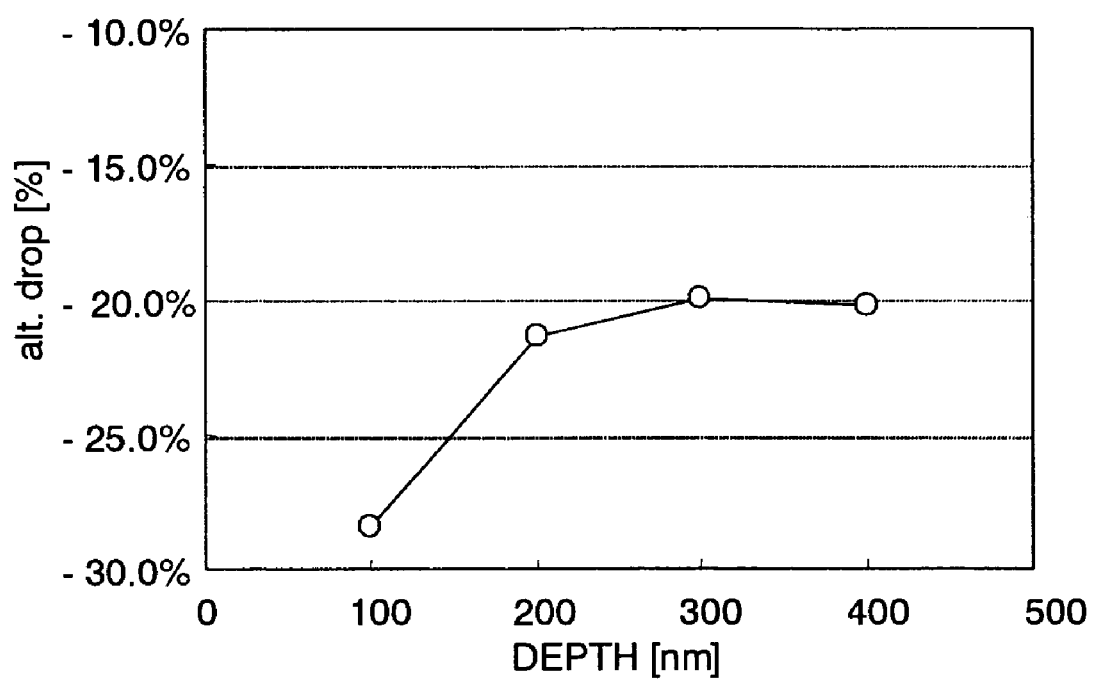
FIG. 16 is a view showing a relation between the cavity depth of the negative pressure dead zone and the pressure reducing characteristic.

FIG. 16 shows a relation between the cavity depth of the negative pressure dead zone and the pressure reducing characteristic. In the case of the conventional two-step slider, it is impossible to provide a negative pressure dead zone of a cavity depth other than the cavity depths of the second steps of the leading pad and the trailing pad, as long as an additional milling process is not provided. Accordingly, there is no option for the cavity depth of the negative pressure dead zone 40 except 100 [um], which is the cavity depth of the second steps of the leading pad region and the trailing pad region from the non-milling surface, so that favorable pressure reducing characteristic cannot be expected. Meanwhile, in the case of the multistep slider adopting the present invention, as options for the cavity depth of the negative pressure dead zone, there are provided the cavity depth (for example, 326 [um]) of the side pad region 32*c* being the third step of the side pad 32 and the milling amount (for example, 200 [um]) for obtaining the side pad region 32*c* being the third step from the side pad region 32*b* being the second step of the side pad 32, enabling to realize a slider with excellent pressure reducing characteristic.

Figure 17:
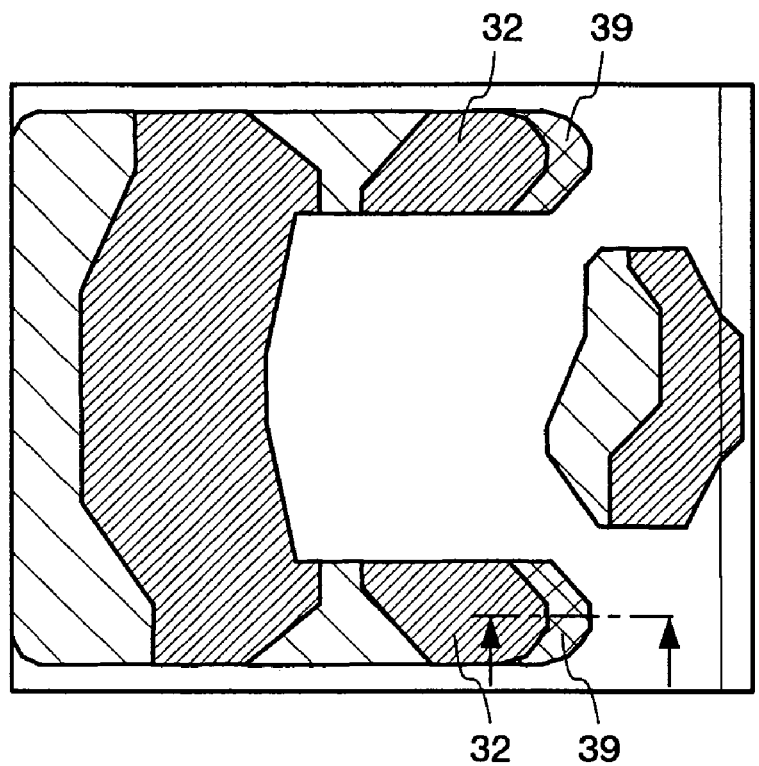
FIG. 17 is a plan view showing an example in which tail cavities are provided at air outflow edge sides of the side pads 32 as an application of a cavity composed of plural steps.
Figure 18:
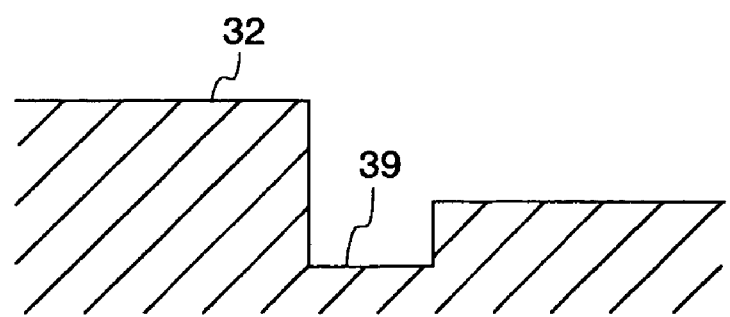
FIG. 18 is a sectional view of a part of the tail cavity.

FIG. 17 is the other one in which deep cavity portions (hereinafter referred to as the "tail cavities") 39 deeper than the negative cavity 34 are provided on the air outflow edge sides of the side pads 32. FIG. 18 shows a section of the portion of the tail cavity 39. The calculations of the flying amounts of the sliders with and without the tail cavities 39 show that the pressure reducing characteristic is improved by 2% in the case of the slider with the tail cavities 39 in terms of the flying amount reduction at the time of pressure reduction on the basis of the flying amount at a normal pressure, so that it is possible to consider that the pressure reducing characteristic can be improved further by arranging the tail cavity 39 at the air outflow edge of the side pad 32.

Figure 19:
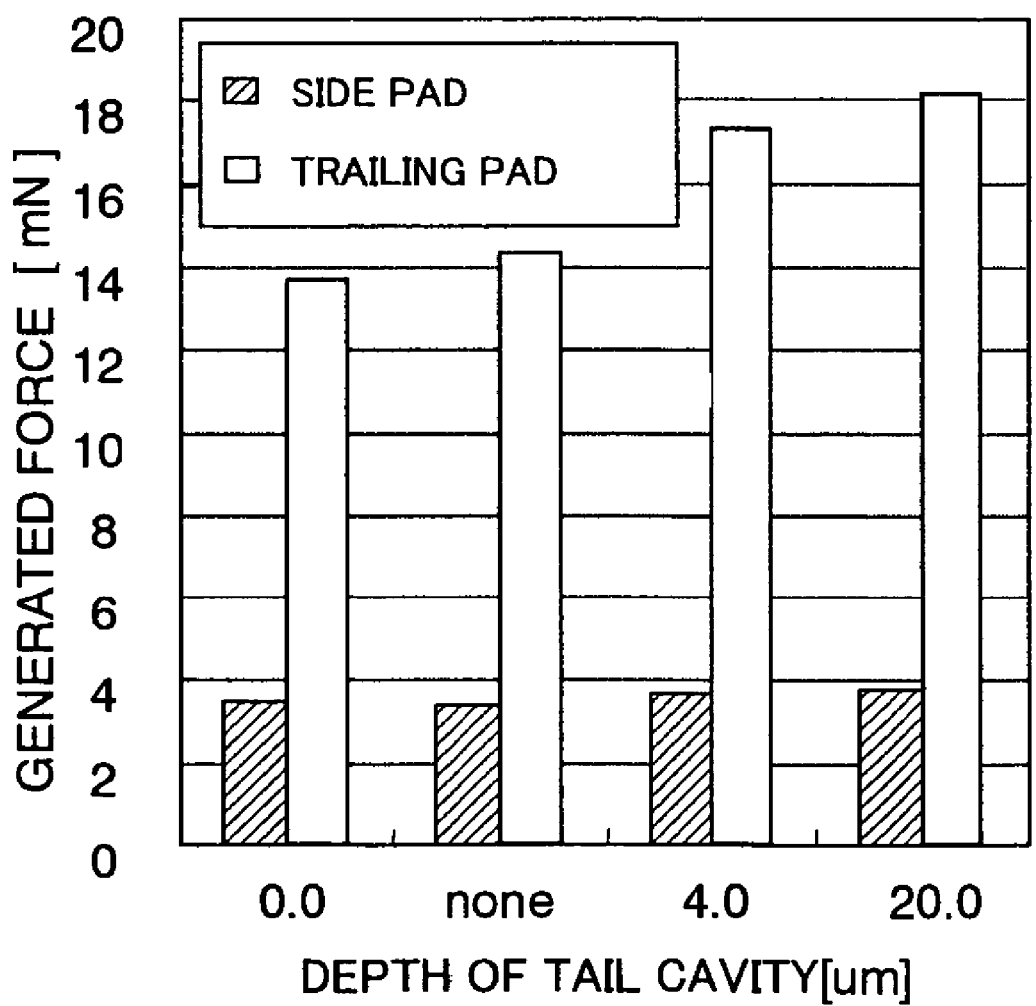
FIG. 19 is a view showing an effect of the tail cavity on the generated force of the side pads and a trailing pad.

The reason thereof will be described below. FIG. 19 shows the comparison result of the generated force calculation at the side pad 32 and the trailing pad 31 for the sliders with and without the tail cavities 39, provided that the flying amount and the posture of the respective sliders with and without the tail cavities are fixed. Based on this, it is found that, regardless of presence or absence of the tail cavities 39 as well as the cavity depth, the generated force at the side pad 32 shows no change, while the generated force at the trailing pad 31 showed an increase in the case of the slider with the tail cavities 39 having a deeper cavity depth of 4.0 [um] or more.

As mentioned above, in order to improve the pressure reducing characteristic, there are two approaches: (1) to generate larger positive pressure at the trailing pad 31, and (2) to use the change in pitching by generating larger pressure at the side pad 32. The present case is applicable to (1) and thereby the pressure reducing characteristic is improved.

In the comparison of the positive pressure distributions between the sliders with and without the tail cavities 39, a positive pressure increase was confirmed at the trailing pad 31 in the case of the slider with the tail cavities 39. Also, in the comparison of negative pressure, it is found that the negative pressure amount shows a reduction in the vicinity of the trailing pad 31 in the case of the slider with the tail cavities 39. The reason is that there is an appropriate cavity depth for a negative pressure cavity in accordance with the space of the position where the negative cavity is arranged, whereas the formation of a deep cavity such as the tail cavities 39 reduces negative pressure generation as compared to the case without the deep cavity, so that the positive pressure increases in the vicinity of the trailing pad.

Subsequently, a method of providing a surface, to which a milling is performed (milling surface), with a plurality of steps will be described. By performing a cycle of masking, milling, and removing the mask three times, the slider 5 having the milling surface with four or more types of steps of different milling depths can be obtained.

Figure 20:
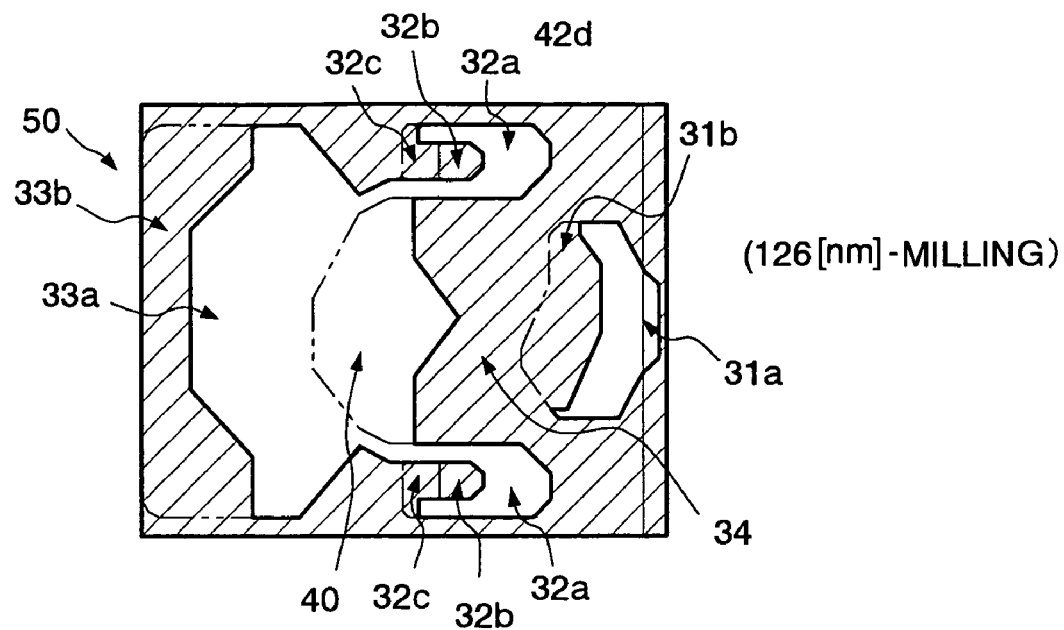
FIG. 20 is a view showing the mask region of a first milling process for providing a milling surface, which is to be subject to a milling, with plural steps.

In the first milling process, as shown in FIG. 20, on the surface of a slider body 50 to form the ABS thereon, a first mask is arranged at those positions (portions without hatchings in FIG. 20) to be a trailing pad region 31a of the first step, side pad regions 32a of the first step, a leading pad region 33a of the first step, and a negative pressure dead zone 40, and a milling is performed up to a first depth for example of 126 [nm] to the respective regions (portions with hatchings in FIG. 20) that are exposed (opened) from the first mask, namely a trailing pad region 31b of the second step, side pad regions 32b of the second step, side pad regions 32c of the third step, a negative cavity 34, a leading pad region 33b of the second step.

Figure 21:
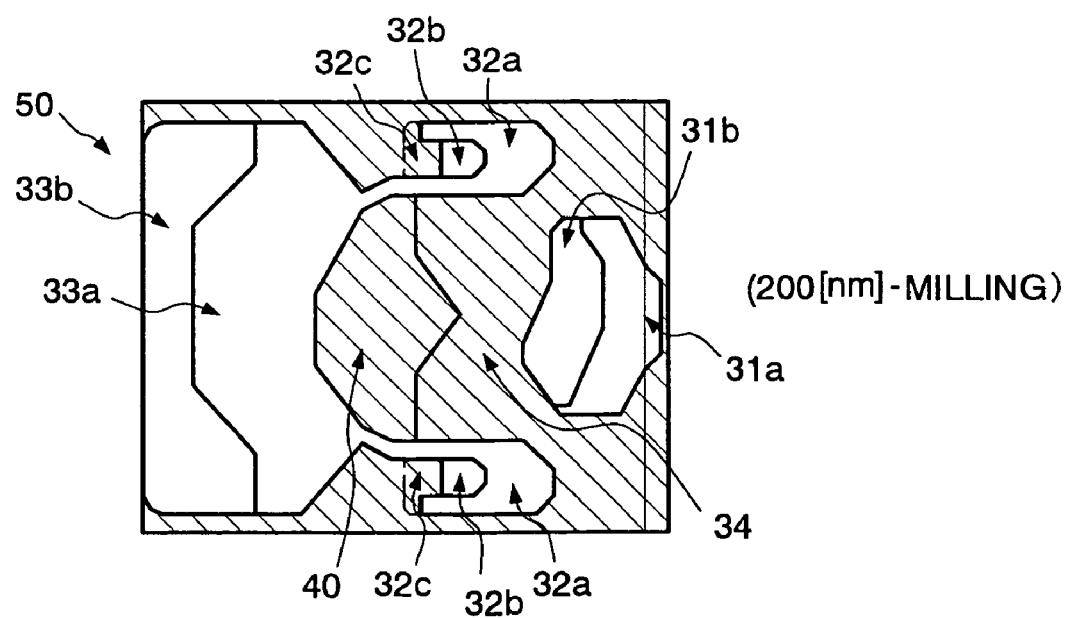
FIG. 21 is a view showing the mask region of a second milling process for providing the milling surface with plural steps.

Next, in a second milling process, as shown in FIG. 21, after removing the first mask, a second mask is arranged on the respective regions of the slider body 50 (the portions without hatching in FIG. 21) to be the leading pad region 33b of the second step, the leading pad region 33a of the first step, the side pad regions 32a of the first step, the side pad regions 32b of the second step, the trailing pad region 31b of the second step, the trailing pad region 31a of the first step, and a milling is performed up to a second depth for example of 200 [nm], which is a depth deeper than the first depth, to the respective regions (portions with hatchings in FIG. 21) that are exposed (opened) from the second mask, namely the regions to be the negative pressure dead zone 40, the side pad regions 32c of the third step, and the negative cavity 34.

Figures 22, 23:
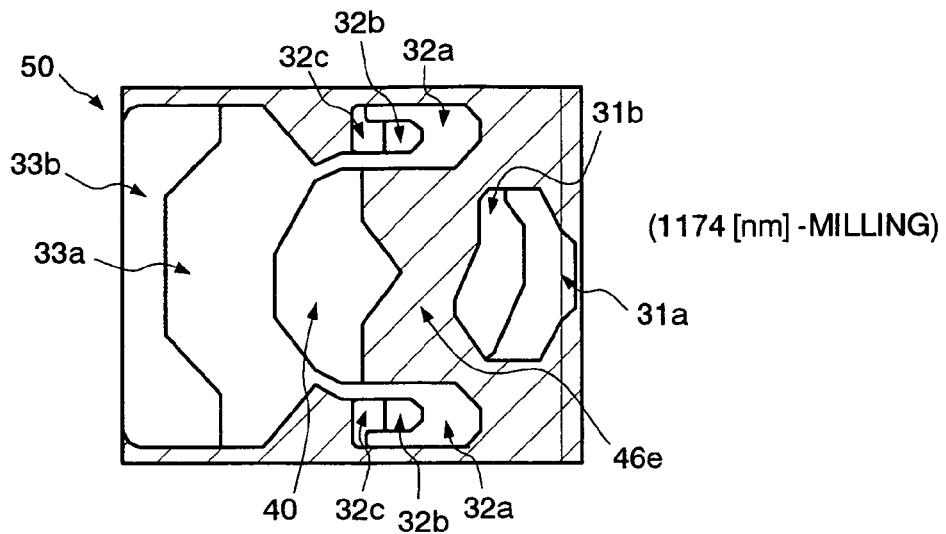
FIG. 22 is a view showing the mask region of a third milling process for providing the milling surface with plural steps.
FIG. 23 shows a view showing the cavity depths obtainable through the three milling steps.

In a third milling process, as shown in FIG. 22, after removing the second mask, a third mask is arranged on the regions of the slider body 50 (the portions without hatching in FIG. 22) to be the leading pad region 33a of the first step, the leading pad region 33b of the second step, the negative cavity 34, the trailing pad region 31a of the first step, the trailing pad region 31b of the second step, and a milling is performed up to a depth for example of 1174 [nm], which is a depth deeper than the first and second depths, to the region of the negative cavity 34 (portions with hatchings in FIG. 22) exposed from the third mask.

FIG. 23 shows the cavity depths of the respective surface regions obtainable by the milling processes performed three times as above. As shown in the drawing, here, the milling surfaces having four or more types of cavity depths including 126 [nm], 200 [nm], 326 [nm], and 1500 [nm] are obtained through three times of milling processes. Note that when the other masking pattern not shown in FIG. 23 are included, the other cavity depths such as 1174 [nm], 1300 [nm], and 1374 [nm] can also be obtained. Briefly, a total of eight (two to the third power) types of cavity depths including the cavity depth=0 (zero) (non-milling surface) can be obtained through the milling processes of three times.

Figure 24A:
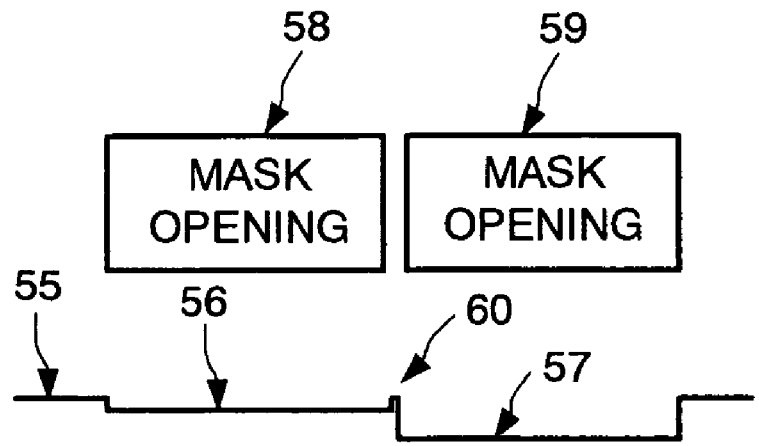
FIGS. 24A and 24B are views for illustrating a mask rule.
Figure 24B:
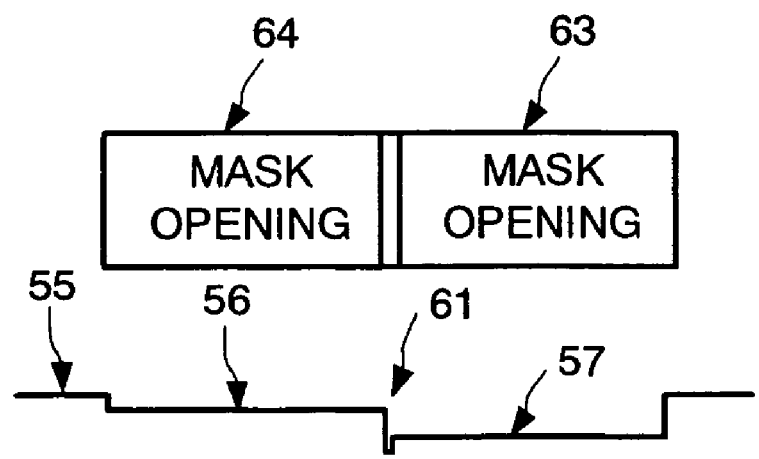

Subsequently, a mask rule will be described. As shown in FIGS. 24A and 24B, when performing a milling, it is necessary not to form a thin wall 60 or a deep recession 61 on the ABS of the slider as much as possible due to a mask displacement.

More specifically, as shown in FIG. 24A, in the formation of adjacent milling surfaces 56, 57 by performing two-step millings to a surface 55, which has experienced no milling, when a space is formed between an opening 58 of one mask and an opening 59 of the other mask due to a misalignment, the space portion is not subject to the milling to thereby remain as the thin wall 60. Once the thin wall 60 is formed, the air flow expected to flow on the step surface is dammed, so that the flying performance is adversely affected. Further, in particular, when the top of the thin wall 60 is a non-milling surface, the non-milling surface possibly becomes a cause to damage the magnetic disk since it is near the disk side.

Further, as shown in FIG. 24B, when an opening 64 of one mask and an opening 63 of the other mask are overlapped with each other, the overlapping portion is subject to a deep milling to thereby remain as a narrow cavity 61 (the milling is basically required once, but is effected doubly here by both the openings). The narrow recession tends to collect dusts in the course of the milling processes and mask removing processes since it remains in shadow. Moreover, even after it is mounted on the body of the magnetic disk apparatus, the dusts tend to be accumulated therein, so that such a cavity may be a cause to lower the reliability of the apparatus. Backed by this, there is provided a rule on a pattern of the mask. Specifically, in order to arrange the milling surfaces of different cavity depths from the surface of the slider adjacently to each other, the region to form the milling surface deeper than the other shall be subject to, at least, a milling process to form a shallow milling surface at the same time before being subject to a milling process to form a deep milling surface.

In other words, referring to FIG. 24A, to the region to form a deeper milling surface 57, before performing a milling processing, at least, a shallow milling processing shall be performed in the same process as the milling process for forming a shallow milling surface 56. With this, at least, the formation of the thin wall 60 can be prevented.

Further, when it is impossible to observe the above-mentioned rule, as shown in FIG. 24B, the masks for forming the deep milling surface 57 and the shallow milling surface 56, respectively, are purposely formed such that the openings 64, 63 thereof overlap with each other. With this, at least, the formation of the thin wall 60 can be prevented even if the narrow cavity 61 is formed in return.

As has been described above, the flying head slider according to the embodiment of the present invention is characterized by being composed of a pair of positive pressure generating parts each having three or more types of surfaces that are substantially in parallel with a surface facing a disk and have different milling depths, the pair of positive pressure generating parts being arranged so as to sandwich a deep portion of a negative pressure generating part in the direction orthogonal to an airflow direction.

Here, the heights of the respective surfaces of the positive pressure generating part may be set such that they gradually become closer to the cavity depth of the deep portion of the negative pressure generating part as they become closer to the air inflow edge. Further, one of the height of the respective surfaces of the positive pressure generating part may be substantially same as that of a non-milling surface.

More specifically, the surface lower than the non-milling surface by one step may have a depth in the range of 50 to 200 [nm], and the surface lower than the non-milling surface by two steps may have a depth in the range of 100 to 700 [nm] from the non-milling surface respectively.

Moreover, it is possible to further improve the efficiency in positive pressure generation of the side pad by surrounding such a region of the surface, out of at least a pair of adjacent surfaces of the positive pressure generating part, that having a cavity depth deeper than the other with the region of the other surface.

According to the flying head slider and the magnetic disk apparatus of the embodiment of the present invention, it is possible to improve the efficiency in positive pressure generation of the side pad, so that the pressure reducing characteristic of the slider can be improved.

It should be noted that the present invention is not intended to be limited to the above-described embodiments, and various modifications may be made therein without departing from the spirit of the present invention.

What is claimed is:

1. A flying head slider, comprising:
   a slider body facing a disk;
   a leading pad to generate positive pressure, the leading pad arranged on an air inflow side of the slider body, the leading pad including a first surface;
   a trailing pad to generate positive pressure, the trailing pad arranged on an air outflow side of the slider body, the trailing pad including a second surface;
   a pair of side pads to generate positive pressure, the pair of side pads arranged on the slider body in a direction orthogonal to an airflow direction, each of the pair of side pads including third, fourth, and fifth surfaces; and
   a cavity area to generate negative pressure, the cavity area surrounded by the leading pad, the trailing pad, and the pair of side pads on the slider body, and including a sixth surface,
   wherein the first, second, third, fourth, fifth, and sixth surfaces are substantially parallel to each other,
   the first, second, and the third surfaces have substantially the same depths and are closer to the disk than each of the fourth, fifth, and sixth surfaces, wherein said fourth and fifth surfaces are at different depths, and
   the sixth surface is deeper than each of the first, second, third, fourth, and fifth surfaces.

2. The flying head slider as set forth in claim 1, wherein the third, fourth and fifth surfaces are arranged in the airflow direction in a descending order, and the fourth surface is deeper than the third surface and the fifth surface is deeper than the fourth surface.

3. The flying head slider as set forth in claim 1, wherein the first, second, and third surfaces are non-milling surfaces.

4. The flying head slider as set forth in claim 1, wherein an air outflow edge of the third surface is arranged on an air inflow side against an air outflow edge of the first surface.

5. The flying head slider as set forth in claim 1, wherein a region of the fourth surface is partially surrounded by a region of the third surface.

6. The flying head slider as set forth in claim 1, wherein the first and third surfaces are connected to each other.

7. A magnetic disk apparatus comprising a flying head slider, the flying head slider comprising:
   a slider body facing a disk;
   a leading pad to generate positive pressure, the leading pad arranged on an air inflow side of the slider body, the leading pad including a first surface;
   a trailing pad to generate positive pressure, the trailing pad arranged on an air outflow side of the slider body, the trailing pad including a second surface;
   a pair of side pads to generate positive pressure, the pair of side pads arranged on the slider body in a direction orthogonal to an airflow direction, each of the pair of side pads including third, fourth, and fifth surfaces first; and
   a cavity area to generate negative pressure, the cavity area surrounded by the leading pad, the trailing pad, and the pair of side pads on the slider body, and including a sixth surface,
   wherein the first, second, third, fourth, fifth, and sixth surfaces are substantially parallel to each other,
   the first, second and the third surfaces have almost the same depths and are closer to the disk than each of the fourth, fifth, and sixth surfaces, wherein said fourth and fifth surfaces are at different depths, and
   the sixth furface is deeper than each of the first, second third, fourth, and fifth surfaces.

8. The magnetic disk apparatus as set forth in claim 7 wherein the third, fourth, and fifth surfaces are arranged in the airflow direction in a descending order, and the fourth surface is deeper than the third surface and the fifth surface is deeper than the fourth surface.

9. The magnetic disk apparatus as set forth in claim 7 wherein the first, second, and third surfaces are non-milling surfaces.

10. The magnetic disk apparatus as set forth in claim 7, wherein the first, second, and third surfaces are non-milling surfaces.

11. The magnetic disk apparatus as set forth in claim 7, wherein an air outflow edge of the third surface is arranged on an air inflow side against an air outflow edge of the first surface.

12. The magnetic disk apparatus as set forth in claim 7, wherein the first and third surfaces are connected to each other.

* * * * *